US007496616B2

United States Patent
Chari et al.

(10) Patent No.: US 7,496,616 B2
(45) Date of Patent: Feb. 24, 2009

(54) METHOD, APPARATUS AND SYSTEM FOR RESISTANCE TO SIDE CHANNEL ATTACKS ON RANDOM NUMBER GENERATORS

(75) Inventors: Suresh Narayana Chari, Scarsdale, NY (US); Vincenzo Valentino Diluoffo, Sandy Hook, CT (US); Paul Ashley Karger, Chappaqua, NY (US); Elaine Rivette Palmer, Goldens Bridge, NY (US); Tal Rabin, Riverdale, NY (US); Josyula Ramachandra Rao, Briarcliff Manor, NY (US); Pankaj Rohatgi, New Rochelle, NY (US); Helmut Scherzer, Tuebingen (DE); Michael Steiner, New York, NY (US); David Claude Toll, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 10/987,640

(22) Filed: Nov. 12, 2004

(65) Prior Publication Data

US 2006/0104443 A1 May 18, 2006

(51) Int. Cl.
*G06F 1/02* (2006.01)
(52) U.S. Cl. .................. 708/250; 708/254; 708/255; 380/46

(58) Field of Classification Search ......... 708/250–256; 380/46
See application file for complete search history.

(56) References Cited

U.S. PATENT DOCUMENTS

| 5,727,063 | A  | * | 3/1998 | Aiello et al. ................. 380/46 |
| 6,253,223 | B1 |   | 6/2001 | Sprunk |
| 6,480,072 | B1 |   | 11/2002 | Walsh et al. |
| 6,628,786 | B1 |   | 9/2003 | Dole |
| 7,047,262 | B2 | * | 5/2006 | Hars ......................... 708/255 |

OTHER PUBLICATIONS

Tsoi et al, Compact FPGA-based Trus and Pseudo Random Number Generators, Apr. 2003, Field-Programmable Custom Computing Machines, 11th Annual IEEE Symposium on, pp. 51-61.*

(Continued)

*Primary Examiner*—Lewis A. Bullock, Jr.
*Assistant Examiner*—Michael Yaary
(74) *Attorney, Agent, or Firm*—Keusey, Tutunjian & Bitetto, P.C.; Brian P. Verminski, Esq.

(57) ABSTRACT

A random number generator (RNG) resistant to side channel attacks includes an activation pseudo random number generator (APRNG) having an activation output connected to an activation seed input to provide a next seed to the activation seed input. A second random number generator includes a second seed input, which receives the next seed and a random data output, which outputs random data in accordance with the next seed. An input seed memory is connected to the activation seed input and a feedback connection from the activation output so that the next seed is stored in the input seed memory to be used by the APRNG as the activation seed input at a next startup cycle.

1 Claim, 3 Drawing Sheets

OTHER PUBLICATIONS

Application Notes and Interpretation of the Scheme (AIS); Functionality classes and evaluation methodology for deterministic random number generators; Certification body of the BSI, Section II 2; http://www.bsi.bund.de/; Dec. 2, 1999; pp. 1-21.

Federal Information Processing Standards Publication Security Requirements for Cryptographic Modules; Information Technology Laboratory, Gaithersburg, MD; May 25, 2001; pp. ii-viii and 1-61.

Application Notes and Interpretation of the Scheme (AIS); Functionality classes and evaluation methodology for deterministic random number generators; Certification body of the BSI in the context of the certification scheme; Sep. 25, 2001; 3 pages.

Federal Information Processing Standards Publication; Digital Signature Standard (DSS); Jan. 27, 2000; pp. 1-74.

* cited by examiner

METHOD, APPARATUS AND SYSTEM FOR RESISTANCE TO SIDE CHANNEL ATTACKS ON RANDOM NUMBER GENERATORS

BACKGROUND OF THE INVENTION

1. Field of the Invention

The present invention relates to protection of random number generation in embedded circuitry, and more specifically, to the protection of random number generation on embedded micro-control circuits.

2. Description of the Related Art

High quality random number generators are important features, among other things, for embedded chips that provide cryptographic operations in the marketplace. The quality of outputs from such random numbers generators is particularly critical. The Random Number Generator (RNG) may be used to provide input for cryptographic algorithms. This is the basis for how these mathematically secure operations can be achieved. These cryptographic operations can include Data Encryption Standard (DES) also known as (symmetric), the RSA algorithm (invented in by Ron Rivest, Adi Shamir, and Leonard Adleman), Digital Signature Algorithm (DSA) also known as asymmetric key generation and other data values used in digital signatures.

It is important for the security and effectiveness of the cryptographic algorithms that the random numbers used in cryptographic operations are of "good" quality, and are kept secret. Random numbers that are predictable open the cryptographic algorithms (or their keys) to attack. Equally, it is of little use to generate a secret key (for a symmetric or an asymmetric algorithm) if the random numbers used for the key are leaked to the outside world.

The act of testing the random numbers for "goodness" or entropy on some embedded systems, such as smart cards, can leak the value of the random bits to the outside world via side channels. Currently, standards for pseudorandom number generators do not solve this problem. Furthermore, embedded devices are susceptible to problems in repeatedly writing to persistent memory, such as Electrically Erasable Programmable Read Only Memory (EEPROM) or Flash memory, that are called "HotSpots". Such memories can be written only a limited number of times, and if that limit is exceeded, then data can no longer be written reliably to the same location.

Current implementations use a stored seed in EEPROM to initialize the RNG and continuously update the seed, thus creating a HotSpot.

There are two fundamental types of Random Number Generators (RNG), namely hardware or "True" Random Number Generators (TRNG), and software or Pseudo Random Number generator (PRNG) that are utilized in cryptographic operations.

A TRNG is produced by a number of ways through electronic circuits. High quality circuits use, for example, a method of using two noise diodes and amplifying the output on to a frequency carrier envelope or by a Voltage Controlled Oscillator (VCO). The output becomes Transistor-transistor logic (TTL) or Complementary Metal Oxide Semiconductor (CMOS) logic that can be correlated to zeros and ones.

As a True RNG may still include bias and correlation from the output random bit stream, it must be tested through software to ensure that there are non-predictable patterns. Currently, there are no standards for non-deterministic testing of TRNG, so they must use what is called continuous output testing (sampling the output).

The Application Notes and Interpretation of the Scheme (AIS) from Bundesamt für Sicherheit in der Informationstechnik (BSI), a German Certification body is the standard owner for AIS 31 and AIS 20. The AIS 31 standard discusses this type of testing (i.e., sampling the output), but for embedded devices where startup performance is critical, this becomes unacceptably slow.

If a TRNG is not supported in an embedded device, then an implementation of a PRNG is usually incorporated. A PRNG is an algorithm that generates a sequence of zeros and ones. The quality of output can be seeded from a number of sources like clock frequency, date/time and other inputs. Cryptography can be used to manipulate the seed like Message-Digest Algorithms (MD5) or Secure Hash Standard (SHA1). These manipulators are called message digests, which act like a fingerprint for data. These techniques decrease the probability that repeatable patterns will occur. There are a number of statistical tests that can be run against the random bit output, that are described in Federal Information Processing Standard (FIPS) 140-1, but in FIPS 140-2, these tests have been dropped. FIPS 140-2 recommends a continuous output testing instead.

The basic software pseudo random number generator (PRNG) has two inputs and an output according to FIPS 186-2.

Referring to FIG. 1, a PRNG 10 receives as input a seed 12 and an optional user input 14. PRNG 10 outputs a random bit stream 16. PRNG 10 is, on system start-up, initialized with secret seed 12, and optional user input 14. Then each time the PRNG 10 is called, it generates additional pseudo random bits 16. The algorithm used within the PRNG is defined in the DSA standard FIPS 186-2.

U.S. Pat. No. 6,628,786, entitled "Distributed state random number generator and method for utilizing same", describes networked computers generating and sharing entropy in proportion to the need for random numbers utilized to initialize the internal state of random number generators residing on the computers.

In U.S. Pat. No. 6,480,072 entitled "Method and apparatus for generating random numbers", a random number generator generates high quality random numbers by sampling the output of a Voltage Controlled Oscillator (VCO) at a frequency much lower than the frequency of the oscillator output. In U.S. Pat. No. 6,253,223 entitled "Robust random number generator", the use of one TRNG and one PRNG is described to provide the mechanism to produce random bits. These three references are herein incorporated by reference in their entirety.

Each of the prior art references described above lack the security features to resist Side Channel Attacks (SCA). They also lack any reference to standards, the secure initial loading of the seed, and hot spot prevention. Therefore, the microcontroller's signals and/or their associated memory/data can be read by external scanning techniques. These techniques come under the class of Side Channel Attacks (SCA) and include power analysis, timing analysis, RF analysis, and template attacks, etc.

One example of an attack is a Power Analysis attack that measures the current consumed by a device, which correlates to the computation being performed within it. Power analysis can reveal the bit sequences that are being processed in the microcontroller, hence making the data known. Examples of well-known Power Analysis attacks include Simple Power Analysis (SPA), Differential Power Analysis (DPA) and template attacks. Related classes of attacks known as Electromagnetic Attacks involve capturing the electromagnetic (EM) emanations from the device. There are also known examples of attacks with combined information from multiple side-channels such as power and EM-emanations.

Another example of prior art problems includes a Trusted Computing Group (TCG) which includes a method within its secure bootstrap process to update its seed value for the RNG at the end of the devices active session. This seed update process can potentially be replayed when writing to non-volatile memory (NVM) by powering down the device before the seed is updated. This means that the same seed value is being used over and over again until the complete seed value can be obtained.

SUMMARY OF THE INVENTION

A random number generator (RNG) resistant to side channel attacks includes an activation pseudo random number generator (APRNG) having an activation output connected to an activation seed input to provide a next seed to the activation seed input. A second random number generator includes a second seed input, which receives the next seed and a random data output, which outputs random data in accordance with the next seed. An input seed memory is connected to the activation seed input and a feedback connection from the activation output so that the next seed is stored in the input seed memory to be used by the APRNG as the activation seed input at a next startup cycle.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides an improved system and method for resisting attacks on random number generators. In one embodiment, the present invention provides a solution to reduce the number of times that the seed is written to non-volatile memory (NVM). The present invention further provides resistance to side channel attacks on random number generators by providing a novel random generator structure to output random data.

Embodiments will be described for resisting attacks in embedded circuitry, software and on random number generators used in smart cards. An aspect of the present invention includes an improved system and method for resisting attacks on random number generators while complying with industry security standards. In a particularly useful embodiment, a provable cryptographic solution that provides a resilient random number generator (RNG) design against side channel attacks is described which includes one or more random number generators which are logically combined to provide a single output.

It should be understood that the elements shown in the FIGS. may be implemented in various forms of hardware, software or combinations thereof. Preferably, these elements are implemented in hardware, software or a combination of both on one or more appropriately programmed general-purpose digital computers having a processor and memory and input/output interfaces.

Figure 2A:
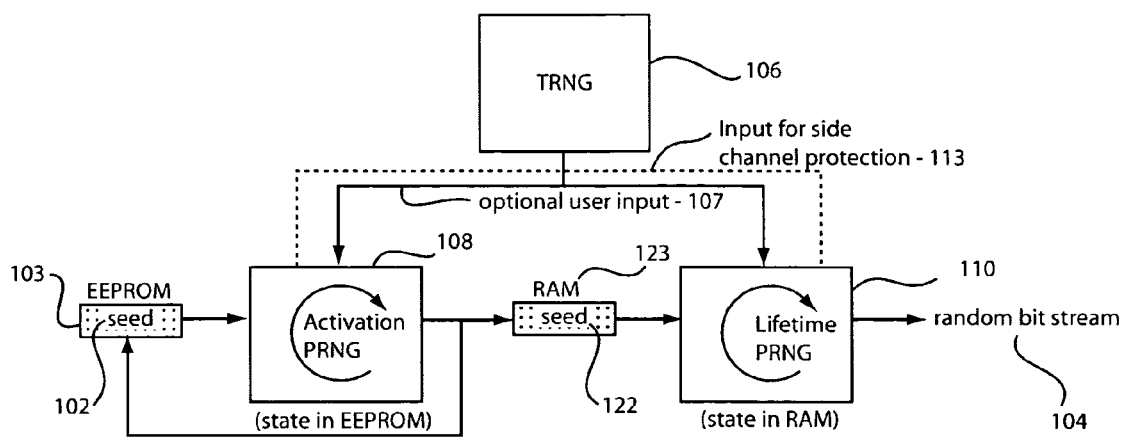
FIGS. 2A and 2B are block diagrams showing two embodiments of a random number generator resistant to side channel attacks in accordance with the present invention.

Referring now to the drawings in which like numerals represent the same or similar elements and initially to FIG. 2A, a high quality Random Number Generator (RNG) 100 is illustratively shown in accordance with one embodiment of the present invention, which may be utilized by embedded chips or cards that are hardware random number generator enabled. One feature of the present invention is to provide a sound cryptographic design, which minimizes the risk of side channel, differential power analysis and/or template attacks for performing cryptographic operations.

A secure process is provided from initial seed storage (seed 102) to output 104 that utilizes both a true hardware random number generator (TRNG) 106 and pseudo-random number generators (PRNGs) 108 and 110 to achieve a secure high quality of random bits.

Figure 1:
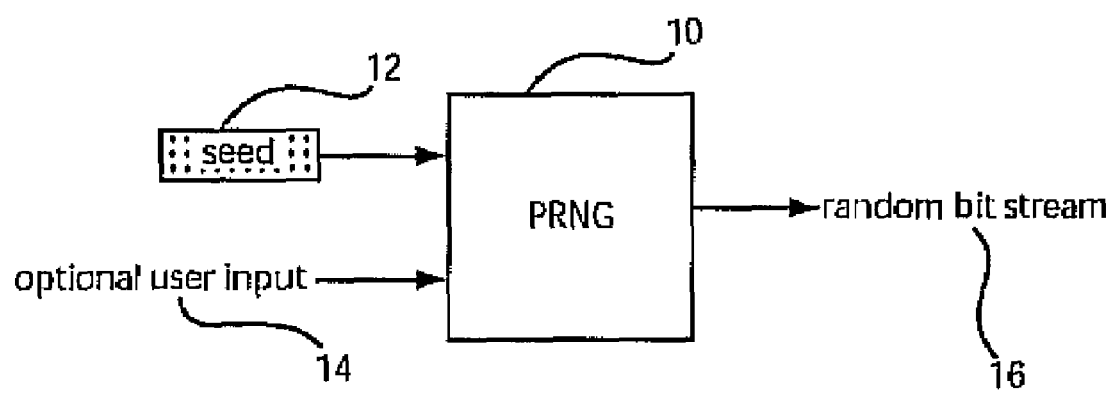
FIG. 1 is a block diagram showing an example of a prior art pseudo random number generator PRNG.

Random number generator 100 is comprised of three components, namely TRNG 106 and two software implementations of a PRNG 108 and 110. PRNGs are preferably implemented in accordance with a standard, e.g., according to FIPS 186-2, each with Input/Output (I/O) characteristics as outlined in FIG. 1 above. PRNG 108 is called the Activation PRNG, or APRNG, and the PRNG 110 is called the Lifetime PRNG, or LPRNG.

Figure 2B:
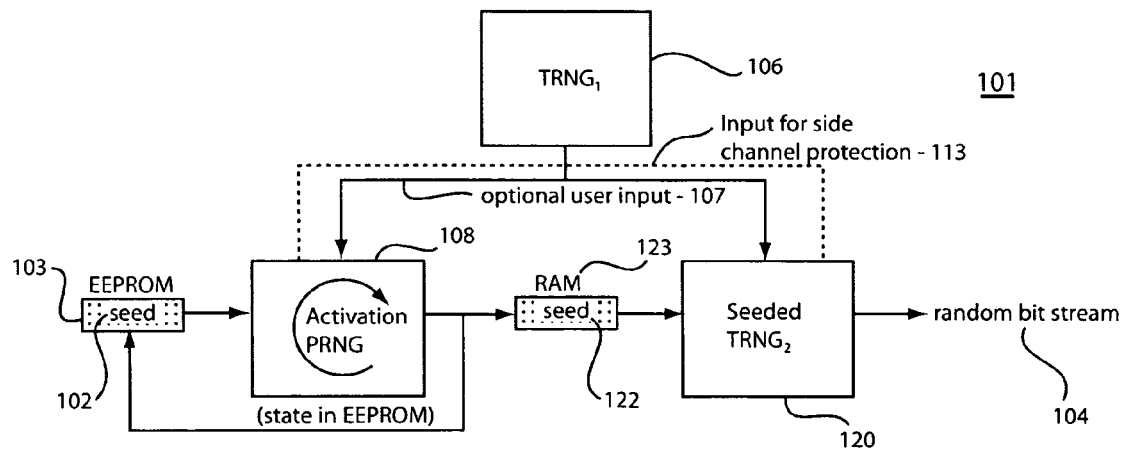

The following set of diagrams can be implemented with PRNG 108 feeding another PRNG 110 as in FIG. 2A or a PRNG 108 feeding a TRNG 120 as in FIG. 2B for RNG 101. The output for each PRNG 108 is seeding the second type of random number generator (110 or 120). For the second case where a PRNG 108 is feeding a TRNG 120, it is a matter of combining two outputs into one through circuitry, preferably logic circuitry. The logic circuitry may vary depending on the application. Design of such circuitry would be known to one skilled in the art.

True Random Number generators may include a seeded True Random Number Generator. True Random Number Generators rely on tapping sources of physical randomness together with some processing logic to output a stream of random numbers. Seeded True Random Numbers, such as TRNG 120 are True Random Number Generators that utilize an additional input seed, say seed 122 to modify the physical tapping and/or the processing logic used for producing the output stream of random numbers. This makes the output of the Seeded True Random Number generator 120 dependent on the seed 122.

Figure 3:
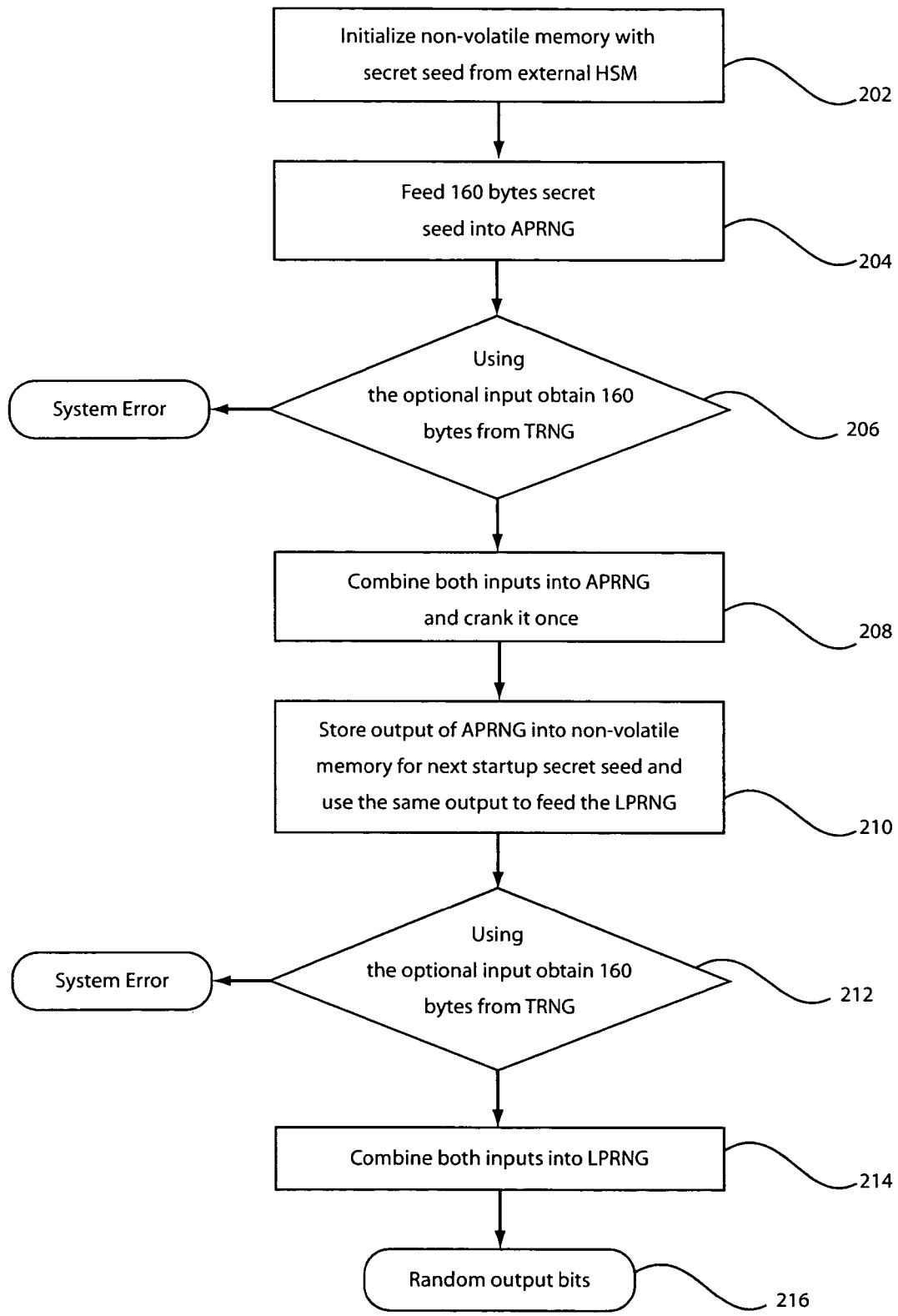
FIG. 3 is a flow chart showing initialization and process flow for one illustrative embodiment of the present invention.

In the case of software to software as shown in FIG. 2A, a flowchart of FIG. 3 provides a detailed description of illustrative operation.

Referring to FIG. 3 with continued reference to FIG. 2A, a description of a software-to-software process is illustratively described for the system shown in FIG. 2A. In block 204, the APRNG 108 is seeded with a unique random secret value (seed 102) that is placed in a non-volatile memory e.g., EEPROM 103 at chip initialization time in block 202. In one embodiment, the random secret value includes a 160-bit number, although other sized numbers may be employed as well.

A Hardware Security Module (HSM) like, e.g., the IBM® 4758 cryptographic, which produces the random value certified by FIPS 140 level 4, produces the generation of the initial secret value, e.g. 20-byte value, in block 202. The secret value 102 is placed on the chip via a secure channel (not shown) between HSM and chip in block 204. Whenever the card is powered up, the APRNG 108 will run to generate an output of the appropriate size (seed 122) to seed the LPRNG 110.

Prior to seeding the LPRNG 110, a new state of the APRNG 110 will be stored in NVM EEPROM 103 and preserved when the card or chip is powered off, and thus available for the next activation of the card or chip.

The output of the LPRNG 110 is used for the applications of the card and the operating system. When the card is powered up the initial state (the seed 122) of the LPRNG 110 is obtained from the APRNG 108.

In one preferred embodiment, the Random Number Generator 100 includes two PRNGs 108 and 110, both according to FIPS 186-2, and one True RNG 106. According to FIPS 186-2, the PRNGs need two different t values, depending on how the random number will be used. R, k, t and x are variables for the mathematical DSA algorithm. R=is the result of the signature operation. k=a randomly or pseudo-randomly generated integer with 0<k<q. t=the fixed variable. X=private key part.

For DSA signing to produce k and R, the following illustrative t value (hexadecimal) may be used:

t=EFCDAB89   98BADCFE   10325476   C3D2E1F0 67452301

For DSA key generation to produce x, and for the generation of general-purpose random numbers, the following t value may be used.

t'=67452301   EFCDAB89   98BADCFE   10325476 C3D2E1F0

The two PRNGs, the APRNG and the LPRNG, may be implemented as the same physical code function within the system. This is a reuse of code statement for implementation purposes.

The APRNG is executed once per activation (e.g., once per power up) of the card or chip. This PRNG is according to the specification of a "General Purpose Random Number Generation" in FIPS 186-2. The APRNG 108 has two inputs. One input includes a unique 160-bit random secret seed value e, which is held in NVM 103. The initial value of e is a 160-bit random number, which is generated and installed in the chip during the chip initialization phase by the chip manufacturer; each chip has its own unique value of e. The APRNG 108 uses an "optional user input" feature 107 of the FIPS 186-2 standard; 160 bits generated by the TRNG may be used for this input in block 206.

The function G(t,c) defined in FIPS 186-2 can be implemented in hardware or software, e.g., in a DES engine. In one embodiment, it is constructed using a hardware DES engine.

The two inputs to the APRNG are combined in block 208. The combining step may include a mathematical or logical operation, for example. The output from APRNG may include a 160-bit value (or other value), Out1, which is used for two purposes in block 210:

1) It is used to generate a value e':

$$e' = e \text{ XOR Out1 XOR 1}$$

This value e' is then written to NVM 103, replacing e. Thus, each time the chip is activated it will have a different value for e. This implementation minimizes the number of writes to NVM 103; therefore, reducing the hotspot problem.

2) It is used as the initial value for f, the seed 122 for the second PRNG 110.

The storage of e in NVM 103 is preferably checksummed and the checksum is verified when it is read, and the checksum generation and verification is preferably DPA resistant (to avoid leaking the value). The calculation of the checksum and rollback logic for writing the key into NVM 103 may include methods know to those skilled in the art and will not be described here for simplicity.

The LPRNG 108 is executed as needed to generate pseudo random numbers. PRNG 108 also preferably conforms to FIPS 186-2. The APRNG has two inputs:

1) For example, a 160-bit random secret seed value f, which is held in random access memory (RAM) 123. (RAM 123 is not subject to the Hotspot problem.) f or seed 122 is initialized on each card or chip activation by taking the output Out1 from the LPRNG 110.

2) The LPRNG 110 uses the "optional user input" feature 107 of the FIPS 186-2 standard.

In blocks 210 and 212, the first time the LPRNG 110 is executed, the optional user input 107 may be 160 bits from the TRNG 106 and 160 bits from the APRNG 110. The TRNG bits and the APRNG bits are combined (e.g., math or logic operation) in block 214. Each subsequent use or crank of the LPRNG 108 will be self-feeding producing a continuous stream of random bits in block 216.

The function G(t,c) defined in FIPS 186-2 may be constructed using the hardware DES engine.

The output in block 216 from LPRNG 108 is a 160-bit value Out2, which is used to generate a value f':

$$f' = f \text{ XOR Out2 XOR 1}.$$

Advantageously, the embodiment described with reference to FIG. 2A can be supported by proof to support standards. Due to the design described in FIG. 2A, in particular the derivation of the new PRNG state as an addition of the output of G with the previous state, the RNG 100 is forward securing. The above construction fulfills all criteria of, e.g., a class K4 DRNG of high strength according to Bundesamt für Sicherheit in der Informationstechnik (BSI) AIS20 standard.

FIPS 186-2 does not impose any requirements on the user input, i.e. it does not need to be random or secret to guarantee pseudo randomness of the output stream or the security of the algorithm. Thus, replacing the user input with the output of the TRNG does not affect the security of the implementation, even if the TRNG malfunctions. On the other hand, if the TRNG is functioning properly then the output of APRNG is truly random, and the output of LPRNG is pseudorandom. Therefore, there is no requirement to test the statistical properties of the bits of the TRNG, as they do not affect the security of the cryptographic aspects of the system. Yet, when it is functioning properly entropy is gained.

Side Channel Attacks:

Side-channel attacks may be applied against and resisted by the present invention using one of the following illustrative techniques:

1.) Simple Power Analysis/Simple ElectroMagnetic (EM) Analysis (SPA/SEMA).

2) Differential Power Analysis/Differential EM Analysis (DPA/DEMA)

3) Template attacks using Power or EM or combination of both.

4) Other attacks.

The implementation of PRNG 100 (or 101) utilizes the following techniques to minimize and practically eliminate the threat posed by these attacks.

1) The sequence of instructions that get executed when the PRNG runs is independent of the PRNG's state. This eliminates many simple power and EM analysis (SPA and SEMA) attacks where different execution sequences have different signal characteristics that can be detected and exploited to extract information about the PRNGs secret state.

2) As defined, the state of the APRNG 108 is updated with fresh input from the TRNG 106 as part of the user input (seed) on invocation of an update function, and the state of the APRNG 108 is updated with data from the TRNG 106 at least once.

3) The implementation utilizes the hardware RNG 100 to implement random masking/share based computation of the PRNG specification. These techniques can hide information about the data being processed by each instruction in the execution sequence and prevent statistical attacks such as differential Power and EM analysis. No testing need be done during operation of the APRNG 108 and LPRNG 110. Testing may cause leakage of information. These techniques provided by the present invention will be described in greater detail herein below.

In some embodiments, the techniques above provide adequate protection against side-channel attacks. Technique 1 eliminates information leakage and SPA attacks based on state dependent execution paths. SPA/SEMA becomes limited to partial information leakage about the internal state during each iteration. This is because in many implementations the largest leakages come from the op-code of the instructions that are being executed, the addresses of the instruction and of the addresses of the operands and the leakages from different operand values is lower.

This leakage of operand values is more prone during the update function where reading the state from NVM in the case of APRND, which could leak hamming weights of bytes. For manipulation of such bytes within RAM (which happens in the case of both APRNG and LPRNG) much less information is expected to leak at each instance of this manipulation, but since each byte is manipulated multiple times the combined leakages can be substantial.

However, Technique 3 minimizes the net leakage of useful information from RAM since SPA will only provide partial information about the random shares of useful information rather than the information directly.

Moreover, Technique 2 ensures that whatever limited information is available via SPA on NVM reads in any iteration of the update function of LPRNG becomes useless for the next iteration.

Classical DPA is not a problem with the LPRNG/APRNG employed in accordance with the present invention since an attacker cannot invoke the update function of any PRNG multiple times with the same secret state. The state gets modified at each invocation of the update function and this constantly evolving secret state is a good defense against DPA style attacks. The attacker gets only one sample to attack any secret state. Even if this was not the case, e.g., the attacker could get multiple samples, Technique 3 is a defense against the resulting DPA attack. The attacker could potentially apply the template attack technique to classify the single signal received during the operation of the APRNG/LPRNG on a given unknown state. Without any defensive measures, this attack may result in the attacker discovering much of the unknown state.

However, technique 3 ensures that the attacker cannot try to match the signal from the target device to be attacked with the signals generated by his own device since his own device cannot create the same random shares that were made in the target device, with any reasonable probability.

The present invention provides a high quality design that meets or exceeds standards for Random Number Generators that are the basis for cryptographic operations. It also guards against different types of attacks as previously discussed. These designs ensure secure and high quality random bits from the placement of the initial seed, the generation and storage of the internal state values, to the ultimate output.

Advantageously, the present invention may comply with Common Criteria EAL5 or above, FIPS 140 level 3 and above, and follows the AIS 31 and 20 standards.

The reason for a secure and high quality Random Number Generator (RNG) is that the output becomes a fundamental basis for cryptography. The present invention provides resistance to such attacks and provides the sound base for high assurance systems.

Having described preferred embodiments of method, apparatus and system for resistance to side channel attacks on random number generators (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A random number generator (RNG) resistant to side channel attacks, comprising:
  a life random number generator (LRNG) having a random data output, life seed input, and a life true input, wherein random number data output from the random data output is employed in a cryptographic system;
  an activation pseudo random number generator (APRNG) having an activation output connected to the life seed input and providing a life seed to the life seed input, the APRNG further having an activation seed input, and an activation true input;
  an input seed memory connected to the activation seed input and further connected through a feedback connection from the activation output so that the life seed is stored in the input seed memory to be used by the APRNG as the activation seed input at a next startup cycle;
  random access memory, which stores the APRNG output for input to the life random number generator; and
  a true random number generator (TRNG) having an output connected to the life true input and the activation true input, the TRNG providing a common entropy signal to the life true input and the activation true input.

* * * * *